3,716,385
OPTICAL GLASSES COMPRISING AIF₃ HAVING A VARYING PARTIAL DISPERSION
Willy Ritze, Mainz-Mombach, Germany, assignor to JENAer Glaswerk Schott & Gen., Mainz, Germany
Filed Apr. 6, 1970, Ser. No. 25,871
Claims priority, application Germany, Apr. 11, 1969, P 19 18 350.7
Int. Cl. C03c 3/00
U.S. Cl. 106—47 Q     3 Claims

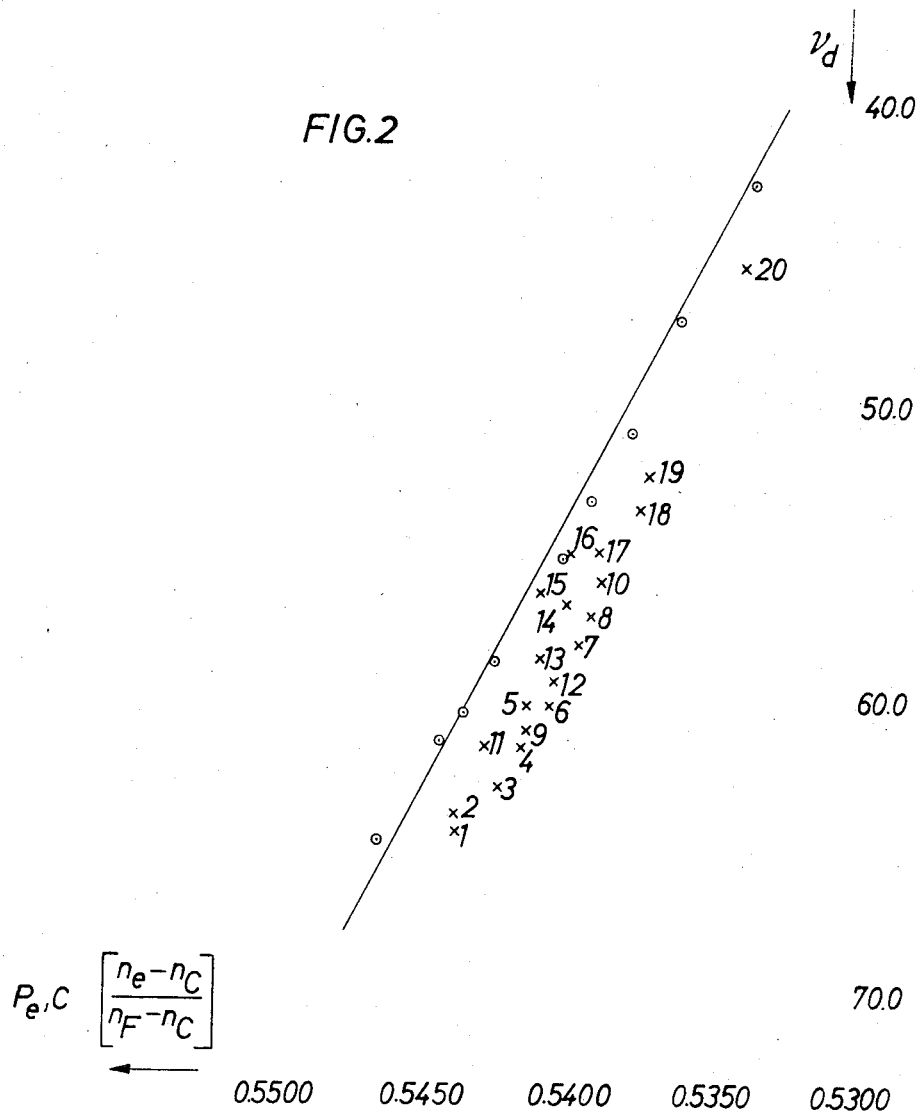

ABSTRACT OF THE DISCLOSURE

Optical, fluorine-containing barium silicate or barium borosilicate glasses having a varying partial dispersion, characterized in that they consist essentially of:

| | Wt. percent |
|---|---|
| $SiO_2$ | 15–45 |
| $B_2O_3$ | 0–15 |
| $SiO_2+B_2O_3$ | 30–47 |
| BaO | 25–56 |
| $BaF_2$ | 0–10 |
| $BaO+BaF_2$ | 35–56 |
| $AlF_3$ | 3–18 |

---

The subject of the invention is optical, fluorine-containing barium silicate glasses and barium borosilicate glasses having a varying partial dispersion. More especially it concerns glasses in the range of the phosphate heavy crowns, heavy crowns, extra-heavy crowns and barium flints, in which the Abbe value $\nu$ with reference to the values $$P_{g,e}=\frac{n_g-n_e}{n_F-n_C} \text{ and } P_{e,C}=\frac{n_e-n_C}{n_F-n_C}$$

is greater than in the known silicate or borosilicate glasses, and which are preferably free of phosphoric acid.

The values $P_{g,e}$ and $P_{e,C}$ are the relative partial dispersions.

Such glasses are important to the optical designer, because due to their varying partial dispersion he is in a position to correct the chromatic aberration of optical systems.

Glasses having a varying partial dispersion are already known. They are glasses which contain mainly phosphoric anhydride, in addition to boric anhydride, as glass formers, and at least one alkaline earth oxide, and can be melted with the addition of $Al_2O_3$, ZnO, CdO, $La_2O_3$, PbO, and $As_2O_3$. The phosphoric anhydride content in these glasses is relatively high, so that they are rather sensitive to weathering. Their optical properties are limited to the glass groups of phosphate crowns, phosphate heavy crowns and a portion of the heavy crowns. Some of them are very aggresive when molten, attacking the platinum crucibles, and their tendency to devitrify prevents continuous production on an industrial scale or melting in large batches.

It is the object of the present invention to obtain glasses whose composition permits their use as a material for optical elements in optical systems without presenting the difficulties in regard to melting and weathering which have been described above, and whose varying optical characteristics will cover a substantially broader range of glasses.

This object is achieved according to the invention for optical, fluorine-containing barium silicate or barium borosilicate glasses having a varying partial dispersion in that they consist essentially of:

| | Wt. percent |
|---|---|
| $SiO_2$ | 15–45 |
| $B_2O_3$ | 0–15 |
| $SiO_2+B_2O_3$ | 30–47 |
| BaO | 25–56 |
| $BaF_2$ | 0–10 |
| $BaO+BaF_2$ | 35–56 |
| $AlF_3$ | 3–18 |

To establish a desired optical position in the range of the heavy and extra-heavy crowns and in the range of the barium flints, the following additional components can be introduced without substantially diminishing the varying partial dispersion:

| | Wt. percent |
|---|---|
| $Na_2O$ and/or— | |
|    $K_2O$ | } 0 to 2 |
|    $Li_2O$ | |
| BeO and/or— | |
|    MgO | |
|    CaO | } 0 to 8 |
|    SrO | |
| ZnO | 0–10 } 0 to 10 |
| CdO | 0–5 |
| PbO | 0–2 |
| $Al_2O_3$ | 0–5 |
| $La_2O_3$ | 0–12 |
| $Bi_2O_3$ | 0–5 |
| $ZrO_2$ | 0–9 |
| $TiO_2$ | 0–14 |
| $ThO_2$ | 0–18 |
| $Nb_2O_5$ | 0–5 |
| $Ta_2O_5$ | 0–8 |
| $WO_3$ | 0–3 |
| $As_2O_3$ and/or $Sb_2O_3$ | 0–2 | the sum of these components not exceeding 25% by weight, and being preferably less than 15% by weight.

An additional fluorine content up to 3% by weight can be put into the melt as, e.g. alkaline earth fluoride (e.g. BeF, $CaF_2$, $MgF_2$) or in other form (e.g., as an alkaline earth alkali silicofluoride).

The $n_d$ values of the glasses according to the invention are greater than 1.54 and the $\nu_d$ values are less than 66.

Glasses of the aforementioned quantitative analysis, and further qualified so as to range in composition as follows have proven to be especially valuable:

| | Wt. percent |
|---|---|
| $SiO_2$ | 18–45 |
| $B_2O_3$ | 0–15 |
| $SiO_2+B_2O_3$ | 30–45 |
| $BaO+BaF_2$ | 40–55 |
| $AlF_3$ | 8–12 |
| $ZrO_2$ | 0–9 |
| $TiO_2$ | 0–3 | the sum of the principal components, $SiO_2$, $B_2O_3$, BaO, $BaF_2$ and $AlF_3$ being greater than 97% by weight.

Glasses having compositions based on these data can be melted in the large platinum or ceramic crucibles and preferably in continuous melting units, to produce glasses of good optical quality. Their chemical resistance is better than that of the phosphate glasses.

On account of the incorporation of $TiO_2+ZrO_2$ the resistance of these glasses according to the invention to acids is better than that of the known silicate or borosilicate glasses having a high barium content.

Examples of the new glasses are listed in the table which follows.

In FIG. 1 the relative partial dispersion $$P_{e,g}=\frac{n_g-n_e}{n_F-n_C}$$

is plotted against the Abbe number $\nu_d$.

TABLE

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| $SiO_2$ | 27.0 | 32.8 | 28.1 | 30.0 | 32.8 | 32.6 | 26.2 | 36.4 | 40.2 | 32.5 | 25.4 | 20.2 | 23.1 | 26.8 | 26.1 | 27.6 | 36.4 | 18.4 | 29.9 | 31.9 |
| $B_2O_3$ | 14.3 | 10.7 | 10.8 | 6.8 | 1.9 | 4.8 | 8.0 | | | 3.8 | 13.5 | 15.2 | 7.6 | 14.2 | 10.8 | 9.6 | | 11.8 | 5.4 | 0.6 |
| $Li_2O$ | | | | | | | | | | | | | 0.15 | | | | | | | |
| $Na_2O$ | | | | | | | | | | | | | 0.30 | | | | | | | |
| $K_2O$ | | | | | | | | | | | | | 0.15 | | | | | | 0.3 | |
| $CaO$ | | | | | | | | | | | | | | | | | | | | |
| $SrO$ | | | | | | | | | | | | | | | | | | | | 0.6 |
| $BaO$ | 36.8 | 45.8 | 49.2 | 51.2 | 54.6 | 52.6 | 53.0 | 52.4 | 50.4 | 52.5 | 25.0 | 54.0 | 49.8 | 44.2 | 36.5 | 44.3 | 45.2 | 43.1 | 45.2 | 41.9 |
| $ZnO$ | | | | | | | | | | | | | | | 8.8 | 1.8 | 1.8 | 3.2 | 0.8 | |
| $TiO_2$ | | 0.1 | 0.1 | 0.6 | 0.1 | 0.1 | 1.9 | 1.8 | 0.1 | 1.8 | | 1.6 | | 2.6 | 1.0 | 2.6 | 2.6 | 2.9 | 3.7 | 7.8 |
| $ZrO_2$ | | | | 0.1 | | | 0.1 | 0.1 | | 0.1 | | 0.1 | | 1.4 | 3.0 | 3.3 | 3.4 | 3.6 | 1.2 | 0.3 |
| $ThO_2$ | 0.8 | | | | | | | | | | | | 6.9 | | | | | | | |
| $La_2O_3$ | | | | | | | | | | | 14.0 | | | | | | | | | 10.2 |
| $WO_3$ | | | | | | | | | | | | | | | 0.3 | | | | | |
| $Ta_2O_5$ | | | | | | | | | | | | | | | | | | | | 2.3 |
| $AlF_3$ | 11.8 | 10.4 | 11.6 | 11.3 | 10.4 | 9.7 | 10.8 | 9.1 | 9.1 | 9.1 | 11.8 | 8.9 | 11.2 | 10.6 | 11.6 | 10.6 | 10.3 | 16.8 | 6.8 | 4.4 |
| $BaF_2$ | 10.0 | | | | | | | | | | 10.0 | | | | | | | | | |
| $As_2O_3$ | 0.3 | 0.2 | 0.2 | 0.1 | 0.2 | 0.2 | | 0.2 | 0.2 | 0.2 | 0.3 | | | 0.2 | 0.2 | 0.2 | 0.3 | 0.2 | 0.3 | |
| $n_d$ | 1.57329 | 1.57250 | 1.58629 | 1.58390 | 1.58301 | 1.59884 | 1.60244 | 1.59970 | 1.58702 | 1.61310 | 1.58835 | 1.60736 | 1.60727 | 1.59696 | 1.60338 | 1.60490 | 1.59519 | 1.60609 | 1.62266 | 1.66754 |
| $\nu_d$ | 64.27 | 63.68 | 62.84 | 61.40 | 60.04 | 60.06 | 58.04 | 57.09 | 60.90 | 55.99 | 61.42 | 59.19 | 58.45 | 56.65 | 56.18 | 54.99 | 54.90 | 53.45 | 52.28 | 45.25 |
| $n_g = n_e/n_F-n_C$ | 0.9955 | 0.9967 | 1.0000 | 1.0042 | 1.0060 | 1.0060 | 1.0106 | 1.0125 | 1.0032 | 1.0137 | 1.0000 | 1.0059 | 1.0067 | 1.0095 | 1.0093 | 1.0137 | 1.0148 | 1.0176 | 1.0202 | 1.0367 |
| $n_e - n_C/n_F-n_C$ | 0.5437 | 0.5438 | 0.5423 | 0.5415 | 0.5413 | 0.5406 | 0.53955 | 0.5392 | 0.5413 | 0.5388 | 0.5428 | 0.5404 | 0.5409 | 0.5409 | 0.5410 | 0.5400 | 0.5389 | 0.5375 | 0.5373 | 0.5340 |

In FIG. 2 the relative partial dispersion $$P_{e,C} = \frac{n_e - n_C}{n_F - n_C}$$

is plotted against the Abbe number $\nu_d$.

In these two figures, the X's indicate glasses according to the invention and circled dots indicate silicate or borosilicate glasses. Values for glasses Nos. 1–20 are given in the preceding table.

EXAMPLE

A batch of raw material, consisting of 1369.9 g. of quartz powder, 537.3 g. of boron trioxide, 86.0 g. of aluminum hydroxide, 2944.7 g. of barium carbonate, 37.5 g. of barium nitrate, 26.5 g. of titanium dioxide, 4.4 g. of zirconium dioxide and 756.2 g. of aluminum fluoride ($AlF_3 \cdot 3H_2O$) are melted in a platinum crucible at a temperature of 1360 to 1380° C., and then clarified for three hours at a temperature of 1420° C. With slow cooling, the glass is then stirred down to 1000° C. and poured into an iron mold preheated to 100° C. The cooling process is performed in a tunnel preheated to 540° C., with a cooling rate of about 7° C. per hour.

What is claimed is:

1. Optical, fluorine-containing barium silicate or barium borosilicate glasses having a varying partial dispersion characterized in that they consist essentially of:

| | |
|---|---|
| $SiO_2$ | 18.4–40.2 |
| $B_2O_3$ | 0–15.2 |
| $SiO_2 + B_2O_3$ | 27.2–43.5 |
| $BaO$ | 25.0–54.6 |
| $BaF_2$ | 0–10 |
| $BaO + BaF_2$ | 35.0–54.6 |
| $AlF_3$ | 4.4–16.8 | and have the following optical values

| | |
|---|---|
| $n_d$ | 1.56702–1.66754 |
| $\nu_d$ | 45.25–64.27 |
| $P_{g,e}$ | 0.9955–1.0367 |
| $P_{e,C}$ | 0.5340–0.5438 |

2. Optical glass according to claim 1 characterized in that it consists essentially of:

| | Wt. percent |
|---|---|
| $SiO_2$ | 29.9 |
| $B_2O_3$ | 5.4 |
| $K_2O$ | 0.3 |
| $BaO$ | 45.2 |
| $ZnO$ | 0.8 |
| $TiO_2$ | 3.7 |
| $ZrO_2$ | 1.2 |
| $La_2O_3$ | 5.2 |
| $Ta_2O_5$ | 1.2 |
| $AlF_3$ | 6.8 |
| $As_2O_3$ | 0.3 | and has the following optical values:

| | |
|---|---|
| $n_d$ | 1.62266 |
| $\nu_d$ | 52.28 |
| $P_{g,e}$ | 1.0202 |
| $P_{e,C}$ | 0.5373 |

3. Optical glass according to claim 1, characterized in that it consists of:

| | Wt. percent |
|---|---|
| $SiO_2$ | 26.2 |
| $B_2O_3$ | 8.0 |
| $BaO$ | 53.0 |
| $AlF_3$ | 10.8 |
| $TiO_2$ | 1.9 |
| $ZrO_2$ | 0.1 | and has the following optical values:

| | |
|---|---|
| $n_d$ | 1.60244 |
| $\nu_d$ | 58.04 |
| $P_{e,g}$ | 1.0160 |
| $P_{e,C}$ | 0.53955 |

(References on following page)

References Cited

UNITED STATES PATENTS

| | | | |
|---|---|---|---|
| 2,456,033 | 12/1948 | Sun | 106—47 Q |
| 3,451,830 | 6/1969 | Nishimoto et al. | 106—52 |
| 2,606,841 | 8/1952 | Armistead | 106—47 Q |
| 2,971,854 | 2/1961 | Geffcken | 106—47 Q |

FOREIGN PATENTS

| | | | |
|---|---|---|---|
| 1,056,335 | 4/1959 | Germany | 106—47 Q |
| 570,108 | 2/1959 | Canada | 106—47 Q |

HYLAND BIZOT, Primary Examiner

W. R. SATTERFIELD, Assistant Examiner

U.S. Cl. X.R.

106—52, 54